(12) United States Patent
Yukawa

(10) Patent No.: US 12,531,701 B2
(45) Date of Patent: *Jan. 20, 2026

(54) APPARATUS AND METHOD FOR COMMUNICATING A MULTI-USER PHYSICAL LAYER PROTOCOL DATA UNIT

(71) Applicant: CANON KABUSHIKI KAISHA, Tokyo (JP)

(72) Inventor: Mitsuyoshi Yukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,815

(22) Filed: Jul. 16, 2024

(65) Prior Publication Data

US 2024/0372681 A1    Nov. 7, 2024

Related U.S. Application Data

(63) Continuation of application No. 17/409,634, filed on Aug. 23, 2021, now Pat. No. 12,063,177, which is a
(Continued)

(30) Foreign Application Priority Data

Feb. 28, 2019   (JP) ................................. 2019-036703

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0094* (2013.01); *H04L 27/2602* (2013.01);
(Continued)

(58) Field of Classification Search
CPC . H04L 5/0053; H04L 5/0094; H04L 27/2602; H04L 69/322; H04W 28/06;
(Continued)

(56) References Cited

U.S. PATENT DOCUMENTS

2019/0116513 A1* 4/2019 Verma ................. H04W 74/002
2019/0373586 A1* 12/2019 Verma ................... H04W 72/51
(Continued)

FOREIGN PATENT DOCUMENTS

JP    2020141327 A    9/2020
JP    2023505097 A    2/2023

OTHER PUBLICATIONS

Roger Hoefel, IEEE 802. 11ax Amendment: The 6G of WLANs, IEE Lain-American Conference on Communications, Nov. 14-16, 2018, Guadalajara, Mexico.

*Primary Examiner* — Afshawn M Towfighi
(74) *Attorney, Agent, or Firm* — Canon U.S.A., Inc. IP Division

(57) ABSTRACT

A communication apparatus communicates an Extremely High Throughput (EHT) Multi-User (MU) Physical Layer Protocol Data Unit (PPDU) including an Extremely High Throughput-Signal-B (EHT-SIG-B) including a resource unit (RU) allocation subfield including N×8 bits, where N=8 holds in a case where the communication apparatus uses a bandwidth of 320 MHz as a bandwidth.

21 Claims, 5 Drawing Sheets

Related U.S. Application Data continuation of application No. PCT/JP2020/006655, filed on Feb. 20, 2020.

(51) Int. Cl.
*H04L 69/322* (2022.01)
*H04W 28/06* (2009.01)
*H04W 72/0453* (2023.01)
*H04W 72/20* (2023.01)

(52) U.S. Cl.
CPC ........... *H04L 69/322* (2013.01); *H04W 28/06* (2013.01); *H04W 72/0453* (2013.01); *H04W 72/20* (2023.01)

(58) Field of Classification Search
CPC .. H04W 72/0453; H04W 72/20; H04W 84/12
See application file for complete search history.

(56) References Cited

U.S. PATENT DOCUMENTS

2020/0045656 A1\* 2/2020 Verma .................. H04L 5/0044
2021/0135779 A1\* 5/2021 Gan ...................... H04L 1/0009

\* cited by examiner

FIG.4

| FIELD VALUE | #1 | #2 | #3 | #4 | #5 | #6 | #7 | #8 | #9 |
|---|---|---|---|---|---|---|---|---|---|
| 00000000 | 26 | 26 | 26 | 26 | 26 | 26 | 26 | 26 | 26 |
| 00000001 | 26 | 26 | 26 | 26 | 26 | 26 | 26 | 52 | 52 |
| 00000010 | 26 | 26 | 26 | 26 | 26 | 52 | 52 | 26 | 26 |
| 00000011 | 26 | 26 | 26 | 26 | 26 | 52 | 52 | 52 | 52 |
| 00000100 | 26 | 26 | 52 | 52 | 26 | 26 | 26 | 26 | 26 |
| 00000101 | 26 | 26 | 52 | 52 | 26 | 26 | 26 | 52 | 52 |
| 00000110 | 26 | 26 | 52 | 52 | 26 | 52 | 52 | 26 | 26 |
| 00000111 | 26 | 26 | 52 | 52 | 26 | 52 | 52 | 52 | 52 |
| 00001000 | 52 | 52 | 26 | 26 | 26 | 26 | 26 | 26 | 26 |
| 00001001 | 52 | 52 | 26 | 26 | 26 | 26 | 26 | 52 | 52 |
| 00001010 | 52 | 52 | 26 | 26 | 26 | 52 | 52 | 26 | 26 |
| 00001011 | 52 | 52 | 26 | 26 | 26 | 52 | 52 | 52 | 52 |
| 00001100 | 52 | 52 | 52 | 52 | 26 | 26 | 26 | 26 | 26 |
| 00001101 | 52 | 52 | 52 | 52 | 26 | 26 | 26 | 52 | 52 |
| 00001110 | 52 | 52 | 52 | 52 | 26 | 52 | 52 | 26 | 26 |
| 00001111 | 52 | 52 | 52 | 52 | 26 | 52 | 52 | 52 | 52 |
| 00010$y_2y_1y_0$ | 52 | 52 | 52 | 52 | — | 106 | 106 | 106 | 106 |
| 00011$y_2y_1y_0$ | 106 | 106 | 106 | 106 | — | 52 | 52 | 52 | 52 |
| 00100$y_2y_1y_0$ | 26 | 26 | 26 | 26 | 26 | 106 | 106 | 106 | 106 |
| 00101$y_2y_1y_0$ | 26 | 26 | 52 | 52 | 26 | 106 | 106 | 106 | 106 |
| 00110$y_2y_1y_0$ | 52 | 52 | 26 | 26 | 26 | 106 | 106 | 106 | 106 |
| 00111$y_2y_1y_0$ | 52 | 52 | 52 | 52 | 26 | 106 | 106 | 106 | 106 |
| 01000$y_2y_1y_0$ | 106 | 106 | 106 | 106 | 26 | 26 | 26 | 26 | 26 |
| 01001$y_2y_1y_0$ | 106 | 106 | 106 | 106 | 26 | 26 | 26 | 52 | 52 |
| 01010$y_2y_1y_0$ | 106 | 106 | 106 | 106 | 26 | 52 | 52 | 26 | 26 |
| 01011$y_2y_1y_0$ | 106 | 106 | 106 | 106 | 26 | 52 | 52 | 52 | 52 |
| 0110$y_1y_0z_1z_0$ | 106 | 106 | 106 | 106 | — | 106 | 106 | 106 | 106 |
| 01110000 | 52 | 52 | 52 | 52 | — | 52 | 52 | 52 | 52 |
| 10$y_2y_1y_0z_2z_1z_0$ | 106 | 106 | 106 | 106 | 26 | 106 | 106 | 106 | 106 |
| 11000$y_2y_1y_0$ | 242 | 242 | 242 | 242 | 242 | 242 | 242 | 242 | 242 |
| 11001$y_2y_1y_0$ | 484 | 484 | 484 | 484 | 484 | 484 | 484 | 484 | 484 |
| 11010$y_2y_1y_0$ | 996 | 996 | 996 | 996 | 996 | 996 | 996 | 996 | 996 |

APPARATUS AND METHOD FOR COMMUNICATING A MULTI-USER PHYSICAL LAYER PROTOCOL DATA UNIT

CROSS-REFERENCE TO RELATED APPLICATIONS

This application is a Continuation of U.S. patent application Ser. No. 17/409,634 filed Aug. 23, 2021, which is a continuation of International Patent Application No. PCT/JP2020/006655, filed Feb. 20, 2020, which claims the benefit of Japanese Patent Application No. 2019-036703, filed Feb. 28, 2019. All of the above documents are hereby incorporated by reference herein in their entireties.

BACKGROUND OF THE INVENTION

Field of the Invention

The present invention relates to an apparatus for communicating data through wireless communication.

Background Art

Institute of Electrical and Electronics Engineers (IEEE) 802.11 series standards are known as WLAN communication standards formulated by the IEEE. WLAN stands for Wireless Local Area Network. The IEEE 802.11 series standards include IEEE 802.11 a/b/g/n/ac/ax standards.

Patent Literature 1 discusses a technique for executing a wireless communication using Orthogonal Frequency Division Multiple Access (OFDMA) in the IEEE 802.11ax standard. In the IEEE 802.11ax standard, high peak throughput is achieved by executing a wireless communication using the OFDMA. Further, in the IEEE 802.11ax standard, multiuser communication for communicating with a plurality of partner apparatuses in parallel is achieved by executing a wireless communication using the OFDMA.

The IEEE has considered the IEEE 802.11 Extremely High Throughput (EHT) standard, which is a successor to the IEEE 802.11ax standard, as the next-generation WLAN communication standard. The IEEE 802.11 EHT standard has considered a technique for extending the bandwidth of a radio wave so as to achieve an improvement in throughput.

CITATION LIST

Patent Literature

PTL 1: Japanese Patent Laid-Open No. 2018-50133

Non Patent Literature

In the case of executing multiuser communication, a part (resource unit (RU)) of a frequency band to be used is allocated to each partner apparatus. However, in the IEEE 802.11ax standard and prior standards, the maximum bandwidth of available radio waves is 160 MHz. Accordingly, in the case of performing communication with a bandwidth of 320 MHz, there is no appropriate frame configuration for communicating information about RU allocation.

SUMMARY OF THE INVENTION

The present invention is directed to enabling a communication apparatus configured to perform communication with a bandwidth of 320 MHz to communicate information about RU allocation using an appropriate frame configuration.

According to an aspect of the present invention, a communication apparatus includes generation means for generating an Extremely High Throughput (EHT) Multi-User (MU) Physical Layer Protocol Data Unit (PPDU), and transmission means for transmitting the EHT MU PPDU including a Legacy-Short Training Field (L-STF), a Legacy-Long Training Field (L-LTF) configured to be communicated after the L-STF; a Legacy-Signal (L-SIG) configured to be communicated after the L-LTF, an Extremely High Throughput-Signal-A (EHT-SIG-A) configured to be communicated after the L-SIG, and fields configured to be communicated after the EHT-SIG-A, the fields including an Extremely High Throughput-Signal-B (EHT-SIG-B) including a resource unit (RU) allocation subfield including N×8 bits, where N=8 holds in a case where the communication apparatus uses a bandwidth of 320 MHz as a bandwidth, an Extremely High Throughput-Short Training Field (EHT-STF) configured to be communicated after the EHT-SIG-B, and an Extremely High Throughput-Long Training Field (EHT-LTF) configured to be communicated after the EHT-STF.

According to another aspect of the present invention, a communication apparatus includes reception means for receiving, from another communication apparatus, an EHT MU PPDU including an L-STF, an L-LTF configured to be communicated after the L-STF, an L-SIG configured to be communicated after the L-LTF, an EHT-SIG-A configured to be communicated after the L-SIG, and fields configured to be communicated after the EHT-SIG-A, the fields including an EHT-SIG-B including an RU allocation subfield including N×8 bits, where N=8 holds in a case where the other communication apparatus uses a bandwidth of 320 MHz as a bandwidth, an EHT-STF configured to be communicated after the EHT-SIG-B, and an EHT-LTF configured to be communicated after the EHT-STF, and communication means for performing data communication based on the EHT MU PPDU received by the reception means.

An information processing apparatus according to the present invention includes generation means for generating an EHT MU PPDU including an L-STF, an L-LTF configured to be communicated after the L-STF, an L-SIG configured to be communicated after the L-LTF, an EHT-SIG-A configured to be communicated after the L-SIG, and fields configured to be communicated after the EHT-SIG-A, the fields including an EHT-SIG-B including an RU allocation subfield including N×8 bits, where N=8 holds in a case where the information processing apparatus uses a bandwidth of 320 MHz as a bandwidth, an EHT-STF configured to be communicated after the EHT-SIG-B, and an EHT-LTF configured to be communicated after the EHT-STF, and an antenna used to transmit the EHT MU PPDU generated by the generation means.

Further features of the present invention will become apparent from the following description of exemplary embodiments with reference to the attached drawings.

BRIEF DESCRIPTION OF THE DRAWINGS

FIG. 4 is a diagram illustrating a correspondence between an RU allocation pattern and an RU allocation subfield in a bandwidth of 20 MHz.

DESCRIPTION OF THE EMBODIMENTS

Exemplary embodiments of the present invention will be described in detail below with reference to the accompanying drawings. The configurations illustrated in the following exemplary embodiments are merely examples, and the present invention is not limited to the illustrated configurations.

Figure 1:
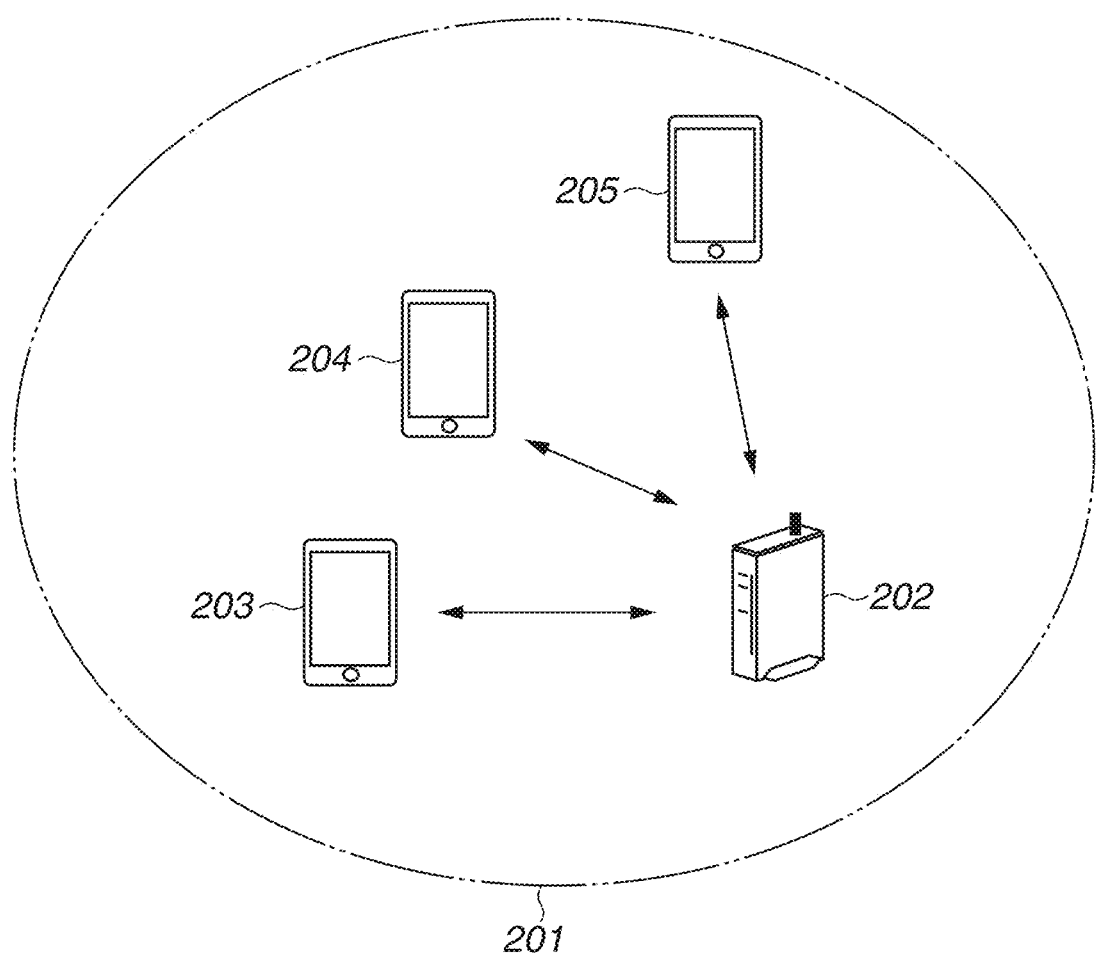
FIG. 1 is a diagram illustrating a configuration of a network in which a communication apparatus 202 participates.

FIG. 1 illustrates a configuration of a network in which a communication apparatus 202 according to the present exemplary embodiment participates. The communication apparatus 202 is an access point (AP) that has a role of constructing a network 201. Communication apparatuses 203, 204, and 205 are stations (STAs) that have a role of participating in the network 201. Each communication apparatus is compliant with the IEEE 802.11 EHT standard and can execute a wireless communication in accordance with the IEEE 802.11 EHT standard via the network 201. IEEE stands for Institute of Electrical and Electronics Engineers. EHT stands for Extremely High Throughput. EHT may be interpreted to stand for Extreme High Throughput. Each communication apparatus can perform communication in frequency bands of 2.4 GHz, 5 GHz, and 6 GHz. Each communication apparatus can also perform communication with bandwidths of 20 MHz, 40 MHz, 80 MHz, 160 MHz, and 320 MHz.

The communication apparatuses 202 to 205 can achieve Multi-User (MU) communication in which signals from a plurality of users are multiplexed by executing an OFDMA communication compliant with the IEEE 802.11 EHT standard. OFDMA communication stands for Orthogonal Frequency Division Multiple Access communication. In the OFDMA communication, a part (resource unit (RU)) of divided frequency bands is allocated to each STA such that the frequency bands do not overlap with each other, and carries of each STA are orthogonal to each other. Accordingly, the AP can communicate with the plurality of STAs in parallel.

The communication apparatuses 202 to 205 can also achieve MU communication by Multi-User Multiple-Input and Multiple-Output (MU MIMO) communication. In this case, the communication apparatus 202 includes a plurality of antennas and allocates one or more antennas to the communication apparatuses 203 to 205, thereby achieving simultaneous communication with the plurality of STAs. The communication apparatus 202 adjusts radio waves to be transmitted to the communication apparatuses 203 to 205 so as to prevent the radio waves from interfering with each other, thereby making it possible to transmit radio waves simultaneously to the plurality of STAs.

The communication apparatus 202 may achieve MU communication using a combination of OFDMA communication and MU MIMO communication. Specifically, in a case where the AP executes MU communication with the plurality of STAs, the AP may execute MU MIMO communication in a number of RUs that are greater than or equal to a certain threshold. For example, in the case of allocating the RUs to the plurality of STAs, the RU with less than 106 subcarriers may communicate with a single STA, and the RU with 106 or more subcarriers may execute MU MIMO communication with the plurality of STAs.

Thus, in the case of executing MU communication, the communication apparatuses 203 to 205 need to acquire information about RU allocation to each STA. Accordingly, the communication apparatus 202 notifies the communication apparatuses 203 to 205 of the allocation of RUs used for data communication to each STA by using a physical layer (PHY) frame.

As described above, the communication apparatuses 202 to 205 are compatible with the IEEE 802.11 EHT standard. In addition, the communication apparatuses 202 to 205 may also be compatible with at least one of the legacy standards that are standards prior to the IEEE 802.11 EHT standard. The legacy standards are IEEE 802.11a/b/g/n/ac/ax standards. The communication apparatuses 202 to 205 may be compatible not only with the IEEE 802.11 series standards, but also with other communication standards such as Bluetooth®, NFC, UWB, ZigBee, and MBOA. UWB stands for Ultra Wide Band. MBOA stands for Multi-Band OFDM Alliance. OFDM stands for Orthogonal Frequency Division Multiplexing. NFC stands for Near Field Communication. UWB includes a wireless universal serial bus (USB), wireless 1394, and WiNET. The communication apparatuses 202 to 205 may also be compatible with communication standards for wired communication such as a wired local area network (LAN).

Specific examples of the communication apparatus 202 include a wireless LAN router and a personal computer (PC). However, the communication apparatus 202 is not limited to these examples. Any communication apparatus may be used as the communication apparatus 202, as long as the communication apparatus can execute MU communication with another communication apparatus. Alternatively, the communication apparatus 202 may be an information processing apparatus, such as a wireless chip, that can execute a wireless communication compliant with the IEEE 802.11 EHT standard. Specific examples of the communication apparatuses 203 to 205 include a camera, a tablet, a smartphone, a PC, a mobile phone, and a video camera. However, the communication apparatuses 203 to 205 are not limited to these examples. Any communication apparatus may be used as the communication apparatuses 203 to 205, as long as the communication apparatus can execute MU communication with another communication apparatus. Alternatively, the communication apparatuses 203 to 205 may be information processing apparatuses such as wireless chips configured to execute a wireless communication compliant with the IEEE 802.11 EHT standard. The network illustrated in FIG. 1 is a network composed of a single AP and three STAs. However, the number of APs and the number of STAs are not limited to this example. Each information processing apparatus, such as a wireless chip, includes an antenna for transmitting generated signals.

Figure 2:
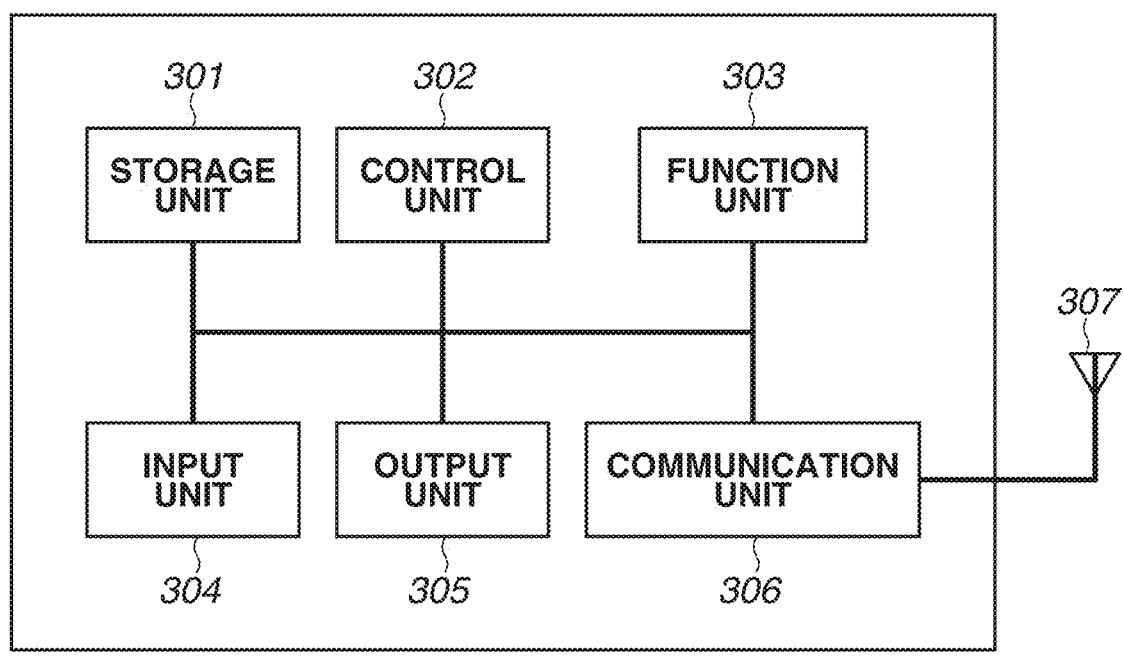
FIG. 2 is a diagram illustrating a hardware configuration of the communication apparatus 202.

FIG. 2 illustrates a hardware configuration of the communication apparatus 202 according to the present exemplary embodiment. The communication apparatus 202 includes a storage unit 301, a control unit 302, a function unit 303, an input unit 304, an output unit 305, a communication unit 306, and an antenna 307.

The storage unit 301 is composed of a memory, such as a ROM or a RAM, and stores computer programs for performing various operations to be described below and various information such as communication parameters for wireless communication. ROM stands for Read Only Memory, and RAM stands for Random Access Memory. As the storage unit 301, not only a memory, such as a ROM or a RAM, but also a storage medium, such as a flexible disk, a hard disk, an optical disc, a magneto-optical disc, a Compact Disc (CD)-ROM, a CD-Recordable (R), a magnetic tape, a nonvolatile memory card, or a digital versatile disc (DVD), may be used. The storage unit 301 may include a plurality of memories or the like.

The control unit 302 is composed of one or more processors, such as CPUs or MPUs, and executes control programs stored in the storage unit 301 to thereby control the entire communication apparatus 202. The control unit 302 may control the entire communication apparatus 202 by cooperatively executing a computer program and an operating system (OS) that are stored in the storage unit 301. Further, the control unit 302 generates data and signals to be transmitted in communication with another communication apparatus. CPU stands for Central Processing Unit, and MPU stands for Micro Processing Unit. The control unit 302 may include a plurality of processors, such as multi-cores, and the entire communication apparatus 202 may be controlled by the plurality of processors.

Further, the control unit 302 controls the function unit 303 to execute a wireless communication or predetermined processing such as image capturing, printing, or projection. The function unit 303 is a piece of hardware used for the communication apparatus 202 to execute the predetermined processing.

The input unit 304 receives various operations from a user. The output unit 305 performs various output operations for the user through a monitor screen or a speaker. In this case, output operations performed by the output unit 305 may include a display on a monitor screen, an audio output through a speaker, and a vibration output. The input unit 304 and the output unit 305 may be configured as a single module, like a touch panel. The input unit 304 and the output unit 305 may be integrated with the communication apparatus 202, or may be separated from each other.

The communication unit 306 controls a wireless communication compliant with the IEEE 802.11 EHT standard. Further, the communication unit 306 may control a wireless communication compliant not only with the IEEE 802.11 EHT standard, but also with other IEEE 802.11 series standards, and may control a wired communication via a wired LAN or the like. The communication unit 306 controls the antenna 307 to transmit and receive signals for wireless communication generated by the control unit 302. If the communication apparatus 202 is compatible not only with the IEEE 802.11 EHT standard, but also with the NFC standard, the Bluetooth® standard, or the like, a wireless communication compliant with these communication standards may be controlled. Further, if the communication apparatus 202 can execute a wireless communication compliant with a plurality of communication standards, the communication unit 306 and the antenna 307 that are compatible with the respective communication standards may be individually provided. The communication apparatus 202 communicates data, such as image data, text data, and video data, with the communication apparatuses 203 to 205 through the communication unit 306. The antenna 307 may be configured separately from the communication unit 306, or the antenna 307 and the communication unit 306 may be configured as a single module.

Figure 3:
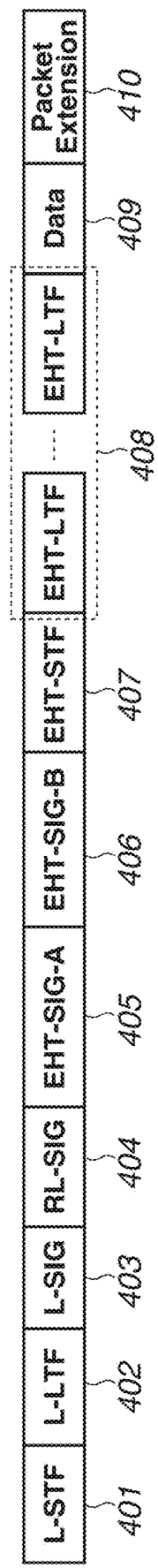
FIG. 3 is a diagram illustrating a configuration example of a physical layer (PHY) frame of an Extremely High Throughput (EHT) Multi-User (MU) Physical Layer Protocol Data Unit (PPDU) to be communicated by the communication apparatus 202.

FIG. 3 illustrates a configuration example of a PHY frame of an EHT MU PPDU to be communicated by the communication apparatus 202 in the present exemplary embodiment. PPDU stands for Physical Layer (PHY) Protocol Data Unit.

The EHT MU PPDU is a PPDU used when a communication apparatus compliant with the IEEE 802.11 EHT standard executes MU communication. This frame is composed of L-STF 401, L-LTF 402, L-SIG 403, RL-SIG 404, EHT-SIG-A 405, EHT-SIG-B 406, EHT-STF 407, and EHT-LTF 408 in this order from the top. The EHT-LTF 408 is followed by data 409 and Packet Extension 410. The alignment sequence of the fields of the EHT MU PPDU is not limited to this example. STF stands for Short Training Field. LTF stands for Long Training Field. SIG stands for Signal. L- stands for Legacy. For example, L-STF stands for Legacy Short Training Field. Similarly, EHT- stands for Extremely High Throughput. For example, EHT-STF stands for Extremely High Throughput Short Training Field. RL-SIG stands for Repeated Legacy Signal. The EHT MU PPDU illustrated in FIG. 3 is transmitted in order from the L-STF 401 by each communication apparatus. Each communication apparatus may generate the entire EHT MU PPDU and then transmit the generated EHT MU PPDU. Alternatively, each communication apparatus may execute the generation and transmission of the EHT MU PPDU in parallel in order from the L-STF 401. Specifically, for example, each communication apparatus may generate the L-LTF 402 in parallel with the process of generating the L-STF 401 and then transmitting the generated field.

The L-STF 401, the L-LTF 402, and the L-SIG 403 each have backward compatibility for the IEEE 802.11a/b/g/n/ac/ax standards that are legacy standards formulated prior to the IEEE 802.11 EHT standard. In other words, the L-STF 401, the L-LTF 402, and the L-SIG 403 are legacy fields that can be decoded by each communication apparatus compatible with the IEEE 802.11 series standards prior to the IEEE 802.11ax.

The L-STF 401 is used to, for example, detect a wireless packet signal and detect an automatic gain control (AGC) or a timing. The L-LTF 402 is used for, for example, acquisition of highly accurate frequency/time synchronization and propagation channel information channel state information (CSI). The L-SIG 403 is used to transmit control information including information about a data transmission ratio and a packet length. The RL-SIG 404 may be omitted.

The EHT-SIG-A 405, the EHT-SIG-B 406, the EHT-STF 407, and the EHT-LTF 408 are fields that can be decoded by each communication apparatus compatible with the IEEE 802.11 EHT standard.

The L-STF 401, the L-LTF 402, the L-SIG 403, the RL-SIG 404, the EHT-SIG-A 405, the EHT-SIG-B 406, the EHT-STF 407, and the EHT-LTF 408 are collectively referred to as a PHY preamble.

The EHT-SIG-B 406 is composed of two fields, i.e., a common field and a user field.

The common field is composed of subfields illustrated in the following Table 1.

TABLE 1

| Subfield | | Number of Bits | Description |
|---|---|---|---|
| Common Field | RU Allocation | N × 8 | Indicates RU allocation used in data unit on frequency axis. If N = 1: Allocation of EHT MU PPDU in 20 MHz and 40 MHz If N = 2: Allocation of EHT MU PPDU in 80 MHz |

TABLE 1-continued

| Subfield | Number of Bits | Description |
| --- | --- | --- |
| | | If N = 4: Allocation of EHT MU PPDU in 160 MHz or 80 + 80 MHz |
| | | If N = 8: Allocation of EHT MU PPDU in 320 MHz or 160 + 160 MHz |
| Center 26-tone RU | 1 | Used when the bandwidth to be used for EHT MU PPDU is 80 MHz or more. Indicates whether to use central 26-tone RUs. |
| CRC | 4 | CRC calculated value. |
| Tail | 6 | Trailer bit. Set to "0". |

An RU allocation subfield is a field that is composed of N×8 bits and indicates information about RU allocation. For example, in the case of indicating RU allocation when a bandwidth of 20 MHz is used as the bandwidth, the RU allocation subfield is composed of eight bits (N=1) and indicates RU allocation in the bandwidth of 20 MHz. In the IEEE 802.11 EHT standard, the bandwidth up to 320 MHz can be used. Accordingly, the RU allocation subfield indicates RU allocation when the bandwidth up to 320 MHz is used. N is a value determined by a bandwidth to be used, and any one of values N=1, 2, 4, 8 is input depending on the bandwidth used for data communication. The correspondence between the value N and each bandwidth (20 MHz, 40 MHz, 80 MHz, 160 MHz, and 320 MHz) is illustrated in Table 1. The case of 80+80 MHz indicates a case where two 80 MHz bandwidths are used. The case of 160+160 MHz indicates a case where two 160 MHz bandwidths are used.

FIG. 4 illustrates an example of a correspondence between an RU allocation pattern and an RU allocation subfield in a bandwidth of 20 MHz. The minimum number of subcarriers constituting each RU is 26. The bandwidth of 20 MHz can be divided into, for example, nine RUs composed of 26 subcarriers. As illustrated in FIG. 4, when an RU allocation bit string indicates "00000000", this indicates the allocation by dividing the bandwidth of 20 MHz into nine RUs composed of 26 subcarriers per RU. When an RU allocation bit string indicates "00000001", this indicates the allocation by dividing the bandwidth of 20 MHz into seven RUs composed of 26 subcarriers per RU and one RU composed of 52 subcarriers per RU.

The RU composed of 106 or more subcarriers is compatible with MU MIMO communication. Accordingly, in the allocation of RUs including the RU composed of 106 or more subcarriers, the RU allocation bit string indicates the number of STAs multiplexed in the RU composed of 106 or more subcarriers. For example, in a case where "y2y1y0" is described, y0, y1, and y2 each indicates "0" or "1" and it is indicated that $(2^2 \times y2 + 2^1 \times y1 + y0 + 1)$ STAs are multiplexed in the RU composed of 106 or more subcarriers.

In a case where a bandwidth of 20 MHz is used in the network 201 illustrated in FIG. 1, the communication apparatuses 203 to 205 decode the common field in the EHT-SIG-B 406 included in the EHT MU PPDU received from the communication apparatus 202. In this case, since the bandwidth of 20 MHz is used, the RU allocation subfield in the common field is composed of eight bits. The communication apparatuses 203 to 205 communicate with the communication apparatus 202 according to the RU allocation indicated by the RU allocation subfield.

Figure 5:
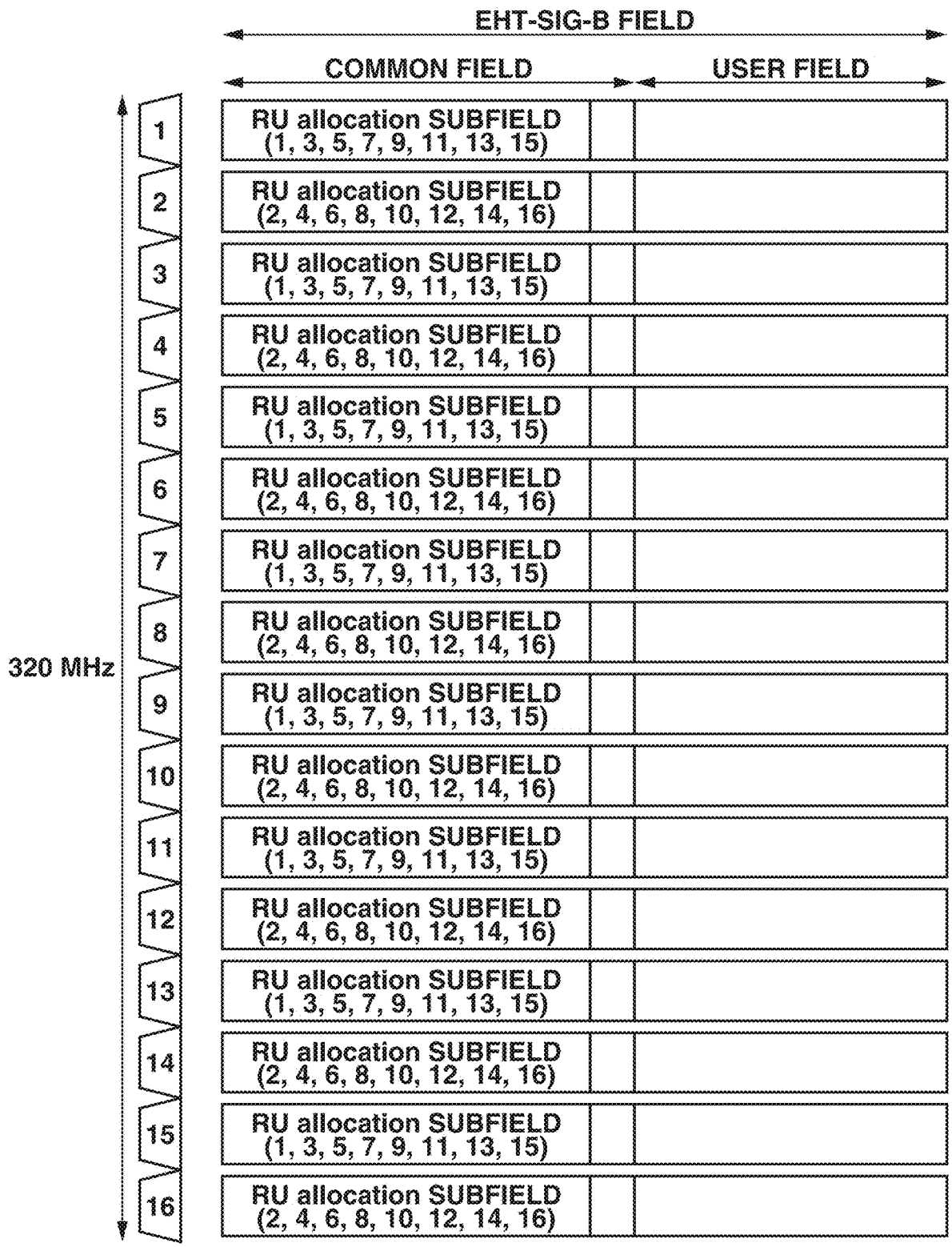
FIG. 5 is a diagram illustrating a configuration example of an Extremely High Throughput-Signal-B (EHT-SIG-B) field in the case of performing communication with a bandwidth of 320 MHz.

FIG. 5 illustrates a configuration example of the EHT-SIG-B field in the case of performing communication using a bandwidth of 320 MHz. The RU allocation subfield indicates the allocation of RUs composed of 242 subcarriers every eight bits. The sub-band of 20 MHz corresponds to the RU composed of 242 subcarriers. In other words, the RU allocation subfield indicates the allocation of RUs in the sub-band corresponding to 20 MHz every eight bits.

In the case of performing communication using a bandwidth of 320 MHz, the communication apparatus 202 divides the bandwidth for each 20-MHz sub-band, and allocates RUs to each sub-band. The bandwidth of 320 MHz can be divided into 16 20-MHz sub-bands. However, not all the RU allocation sub-bands are included in the EHT-SIG-B field. As illustrated in FIG. 5, the communication apparatus 202 generates the EHT-SIG-B field including information about RU allocation for odd-numbered sub-bands and the EHT-SIG-B field including information about RU allocation for even-numbered sub-bands in order from a lowest frequency, and transmits the generated fields. Specifically, the communication apparatus 202 communicates, every eight bits, the EHT-SIG-B field indicating the RU allocation for the first, third, fifth, seventh, ninth, eleventh, thirteenth, and fifteenth 20-MHz sub-bands. Further, the communication apparatus 202 communicates the EHT-SIG-B field indicating the RU allocation for even-numbered 20-MHz sub-bands, separately from the EHT-SIG-B field indicating the RU allocation for odd-numbered 20-MHz sub-bands. In this case, the RU allocation subfield indicates RU allocation using eight bits per sub-band. Accordingly, 64 bits may be desirably used to indicate the RU allocation for eight sub-bands. Thus, in the case of performing communication with a bandwidth of 320 MHz, the communication apparatus 202 communicates the EHT-SIG-B field including 32-bit RU allocation subfields with the communication apparatuses 203 to 205.

Similarly, in the case of using a bandwidth with the number N=2 or more, the EHT-SIG-B field including information about RU allocation for odd-numbered sub-bands and the EHT-SIG-B field including information about RU allocation for even-numbered sub-bands are generated and transmitted. The bandwidth with the number N=2 or more is any one of a bandwidth of 80 MHz, a bandwidth of 160 MHz, and two 160 MHz bandwidths.

Thus, the communication apparatus 202 generates the EHT MU PPDU including the RU allocation subfield and transmits the generated EHT MU PPDU, thereby making it possible to notify the communication apparatuses 203 to 205 of information about RU allocation.

Further, the communication apparatuses 203 to 205 receive the EHT MU PPDU including the RU allocation subfield, thereby making it possible to acquire information about RU allocation.

The EHT-SIG-B is a field that is included in the EHT MU PPDU and is not included in a PPDU other than the EHT MU PPDU. Specifically, the EHT-SIG-B is not included in an EHT Single User (SU) PPDU to be communicated when single user communication (communication between the AP and a single STA) is executed. Further, the EHT-SIG-B is not included in an EHT Extended Range (ER) SU PPDU to be communicated when the single user communication in which a communication distance is extended is executed. Further, the EHT-SIG-B is not included in an EHT Trigger-Based (TB) PPDU to be transmitted as a response from the STA that has received a trigger frame from the AP.

The RU allocation indicated by each bit string in the RU allocation subfields illustrated in the present exemplary embodiment is merely an example. The RU allocation indicated by each bit string in the RU allocation subfields may be different from that described in the present exemplary embodiment.

While the present exemplary embodiment illustrates an example where the communication apparatus 202 is an AP in a network. However, the communication apparatus 202 may be an apparatus that operates as an STA. While the present exemplary embodiment illustrates an example where the communication apparatus 202 is an apparatus that transmits the EHT MU PPDU. However, the communication apparatus 202 may be an apparatus that receives the EHT MU PPDU. In this case, the communication apparatus 202 executes data communication with a frame transmission source apparatus using the RU indicated by the RU allocation subfield included in the EHT-SIG-B of the received EHT MU PPDU.

In the present exemplary embodiment, the PHY frame of the EHT MU PPDU includes legacy fields that can be decoded by each communication apparatus compatible with the IEEE 802.11 series standards prior to the IEEE 802.11ax standard. However, the configuration of the PHY frame is not limited to this example. Specifically, the PHY frame of the EHT MU PPDU may be configured to exclude L-STF, L-LTF, L-SIG, and RL-SIG. In this case, the PHY frame of the EHT TB PPDU may be composed of EHT-STF, EHT-LTF, EHT-SIG-A, EHT-SIG-B, EHT-LTF, a data field, and Packet Extension in this order from the top. The EHT-LTF that follows the EHT-SIG-B field may be omitted. For example, in the case of performing communication with a bandwidth of 6 GHz, each communication apparatus compatible only with the standards prior to the IEEE 802.11ax standard does not receive any signal, and thus may perform communication using the EHT MU PPDU including no legacy field.

The name of each field, the position of each bit, and the number of bits used in the present exemplary embodiment are not limited to those described in the present exemplary embodiment. Similar information may be stored in the PHY frame with any field name, at any position, and with any number of bits other than those described above.

While the exemplary embodiments have been described in detail above, the present invention can employ exemplary embodiments as, for example, a system, an apparatus, a program, or a recording medium (storage medium). Specifically, the present invention may be applied to a system composed of a plurality of devices (e.g., a host computer, an interface device, an image capturing apparatus, and a web application), or may be applied to an apparatus composed of a single device.

The present invention can also be implemented by processing in which a program for implementing one or more functions according to the above-described exemplary embodiments is supplied to a system or an apparatus via a network or a storage medium, and one or more processors in a computer of the system or the apparatus read out and execute the program. The present invention can also be implemented by a circuit (e.g., an application specific integrated circuit (ASIC)) for implementing one or more functions.

The present invention is not limited to the above-described exemplary embodiments, and various modifications and changes can be made without departing from the spirit and scope of the present invention. Accordingly, the following claims are attached to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a communication apparatus configured to perform communication with a bandwidth of 320 MHz can communicate information about RU allocation using an appropriate frame configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
generation means for generating a Multi-User (MU) Physical Layer Protocol Data Unit (PPDU); and
transmission means for transmitting the MU PPDU including:
a Legacy-Short Training Field (L-STF);
a Legacy-Long Training Field (L-LTF) configured to be communicated after the L-STF;
a Legacy-Signal Field configured to be communicated after the L-LTF;
a second Signal Field configured to be communicated after the Legacy-Signal field; and
a third Signal Field configured to be communicated after the second Signal Field, the third Signal Field at least including:
resource unit (RU) Allocation subfields,
wherein in a case where the communication apparatus uses a bandwidth of 320 MHz as a bandwidth, the RU Allocation subfields are configured so that a total bit for indicating information is a predetermined number of bits representing a RU allocation to each sub-band multiplied by 8,
wherein in a case where the communication apparatus uses a bandwidth of 160 MHz as a bandwidth, the RU Allocation subfields are configured so that a total bit for indicating information is the predetermined number of bits representing a RU allocation to each sub-band multiplied by 4, wherein in a case where the communication apparatus uses a bandwidth of 80 MHz as a bandwidth, the RU Allocation subfields are configured so that a total bit for indicating information is the predetermined number of bits representing a RU allocation to each sub-band multiplied by 2, and wherein in a case where the communication apparatus uses one of a bandwidth of 40 MHz and a bandwidth of 20 MHz as a bandwidth, the RU Allocation subfields are configured so that a total bit for indicating information is the predetermined number of bits representing a RU allocation to each sub-band multiplied by 1;

a second Short Training Field configured to be communicated after the third Signal Field; and a second Long Training Field configured to be communicated after the second Short Training Field.

2. The communication apparatus according to claim 1, wherein the transmission means includes an antenna used to transmit the MU PPDU.

3. The communication apparatus according to claim 1, wherein the transmission means transmits the MU PPDU in a case where the communication apparatus executes at least one of Orthogonal Frequency Division Multiple Access (OFDMA) communication and Multi-User Multiple-Input and Multiple-Output (MU-MIMO) communication.

4. The communication apparatus according to claim 1, wherein in a case where the transmission means transmits a PPDU different from the MU PPDU, the transmission means transmits a PPDU not including the third Signal Field.

5. The communication apparatus according to claim 1, wherein the transmission means transmits the MU PPDU compliant with Institute of Electrical and Electronics Engineers (IEEE) 802.11 series standards.

6. The communication apparatus according to claim 1, wherein the RU Allocation subfields indicate RU allocation for odd-numbered 20-MHz sub-bands in order from a lowest frequency every predetermined number of bits.

7. The communication apparatus according to claim 1, wherein the RU Allocation subfields indicate RU allocation for odd-numbered 20-MHz sub-bands in order from a lowest frequency every predetermined number of bits, and in a case where the transmission means transmits the MU PPDU, the transmission means transmits the RU Allocation subfields using a first bandwidth of bandwidths to transmit the MU PPDU and transmits second RU Allocation subfields indicating RU allocation for even-numbered 20-MHz sub-bands in order from a lowest frequency every predetermined number of bits and having a same number of bits as that of the RU Allocation subfields using a second bandwidth different from the first bandwidth of the bandwidths to transmit the MU PPDU.

8. The communication apparatus according to claim 1, wherein the predetermined number of bits is 8.

9. A non-transitory computer readable medium that stores a program for causing a computer to function as each means of the communication apparatus according to claim 1.

10. A communication apparatus comprising:
reception means for receiving, from another communication apparatus, an MU PPDU including:
a L-STF;
a L-LTF configured to be communicated after the L-STF;
a Legacy-Signal field configured to be communicated after the L-LTF;
a second Signal Field configured to be communicated after the Legacy-Signal field; and a third Signal Field configured to be communicated after the second Signal Field, the third Signal Field at least including:
resource unit (RU) Allocation subfields,
wherein in a case where the communication apparatus uses a bandwidth of 320 MHz as a bandwidth, the RU Allocation subfields are configured so that a total bit for indicating information is a predetermined number of bits representing a RU allocation to each sub-band multiplied by 8, wherein in a case where the communication apparatus uses a bandwidth of 160 MHz as a bandwidth, the RU Allocation subfields are configured so that a total bit for indicating information is the predetermined number of bits representing a RU allocation to each sub-band multiplied by 4, wherein in a case where the communication apparatus uses a bandwidth of 80 MHz as a bandwidth, the RU Allocation subfields are configured so that a total bit for indicating information is the predetermined number of bits representing a RU allocation to each sub-band multiplied by 2, and wherein in a case where the communication apparatus uses one of a bandwidth of 40 MHz and a bandwidth of 20 MHz as a bandwidth, the RU Allocation subfields are configured so that a total bit for indicating information is the predetermined number of bits representing a RU allocation to each sub-band multiplied by 1;

a second Short Training Field configured to be communicated after the third Signal Field; and a second Long Training Field configured to be communicated after the second Short Training Field; and communication means for performing data communication based on the MU PPDU received by the reception means.

11. The communication apparatus according to claim 10, wherein the reception means includes an antenna used to receive the MU PPDU.

12. The communication apparatus according to claim 10, wherein the reception means receives the MU PPDU in a case where the other communication apparatus executes at least one of Orthogonal Frequency Division Multiple Access (OFDMA) communication and Multi-User Multiple-Input and Multiple-Output (MU-MIMO) communication.

13. The communication apparatus according to claim 10, wherein in a case where the reception means receives a PPDU different from the MU PPDU, the reception means receives a PPDU not including the third Signal Field.

14. The communication apparatus according to claim 10, wherein the reception means receives the MU PPDU compliant with IEEE 802.11 series standards.

15. The communication apparatus according to claim 10, wherein the RU Allocation subfields indicate RU allocation for odd-numbered 20-MHz sub-bands in order from a lowest frequency every predetermined number of bits.

16. The communication apparatus according to claim 10, wherein the RU Allocation subfields indicate RU allocation for odd-numbered 20-MHz sub-bands in order from a lowest frequency every predetermined number of bits, and in a case where the transmission means transmits the MU PPDU, the transmission means transmits the RU Allocation subfields using a first bandwidth of bandwidths to transmit the MU PPDU and transmits second RU Allocation subfields indicating RU allocation for even-numbered 20-MHz sub-bands in order from a lowest frequency every predetermined number of bits and having a same number of bits as that of the RU Allocation subfields using a second bandwidth different from the first bandwidth of the bandwidths to transmit the MU PPDU.

17. The communication apparatus according to a claim 10, wherein the predetermined number of bits is 8.

18. The communication apparatus according to claim 10, wherein the L-STF, the L-LTF, and the Legacy-Signal field are fields configured to be decoded by a communication apparatus compatible with Institute of Electrical and Electronics Engineers (IEEE) 802.11 series standards prior to IEEE 802.11ax standard.

19. A non-transitory computer readable medium that stores a program for causing a computer to function as each means of the communication apparatus according to claim 10.

20. A control method for a communication apparatus, comprising:
- a generation step of generating a Multi-User (MU) Physical Layer Protocol Data Unit (PPDU); and
- a transmission step of transmitting the MU PPDU including:
- a L-STF;
- a L-LTF configured to be communicated after the L-STF;
- a Legacy-Signal field configured to be communicated after the L-LTF;
- a second Signal Field configured to be communicated after the Legacy-Signal field; and
- a third Signal Field configured to be communicated after the second Signal Field, the third Signal Field at least including:
- resource unit (RU) Allocation subfields,
  - wherein in a case where the communication apparatus uses a bandwidth of 320 MHz as a bandwidth, the RU Allocation subfields are configured so that a total bit for indicating information is a predetermined number of bits representing a RU allocation to each sub-band multiplied by 8,
  - wherein in a case where the communication apparatus uses a bandwidth of 160 MHz as a bandwidth, the RU Allocation subfields are configured so that a total bit for indicating information is the predetermined number of bits representing a RU allocation to each sub-band multiplied by 4,
  - wherein in a case where the communication apparatus uses a bandwidth of 80 MHz as a bandwidth, the RU Allocation subfields are configured so that a total bit for indicating information is the predetermined number of bits representing a RU allocation to each sub-band multiplied by 2, and
  - wherein in a case where the communication apparatus uses one of a bandwidth of 40 MHz and a bandwidth of 20 MHz as a bandwidth, the RU Allocation subfields are configured so that a total bits for indicating information is the predetermined number of bits representing a RU allocation to each sub-band multiplied by 1;
- a second Short Training Field configured to be communicated after the third Signal Filed; and
- a second Long Training Field configured to be communicated after the second Short Training Field.

21. A control method for a communication apparatus, comprising:
- a reception step of receiving, from another communication apparatus, an MU PPDU including:
- a L-STF;
- a L-LTF configured to be communicated after the L-STF;
- a Legacy-Signal field configured to be communicated after the L-LTF;
- a second Signal Field configured to be communicated after the Legacy-Signal field; and
- a third Signal Field configured to be communicated after the second Signal Field, the third Signal Field at least including:
- resource unit (RU) Allocation subfields,
  - wherein in a case where the communication apparatus uses a bandwidth of 320 MHz as a bandwidth, the RU Allocation subfields are configured so that a total bit for indicating information is a predetermined number of bits representing a RU allocation to each sub-band multiplied by 8,
  - wherein in a case where the communication apparatus uses a bandwidth of 160 MHz as a bandwidth, the RU Allocation subfields are configured so that a total bit for indicating information is the predetermined number of bits representing a RU allocation to each sub-band multiplied by 4,
  - wherein in a case where the communication apparatus uses a bandwidth of 80 MHz as a bandwidth, the RU Allocation subfields are configured so that a total bit for indicating information is the predetermined number of bits representing a RU allocation to each sub-band multiplied by 2, and
  - wherein in a case where the communication apparatus uses one of a bandwidth of 40 MHz and a bandwidth of 20 MHz as a bandwidth, the RU Allocation subfields are configured so that a total bits for indicating information is the predetermined number of bits representing a RU allocation to each sub-band multiplied by 1;
- a second Short Training Field configured to be communicated after the third Signal Field; and
- a second Long Training Field configured to be communicated after the second Short Training Field; and
- a communication step of performing data communication based on the MU PPDU received in the reception step.

* * * * *